April 19, 1938.  P. HORINSTEIN  2,114,711
MIRROR UNIT
Filed Aug. 9, 1937  3 Sheets-Sheet 2
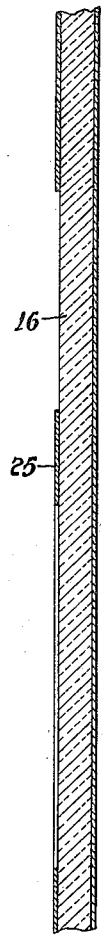
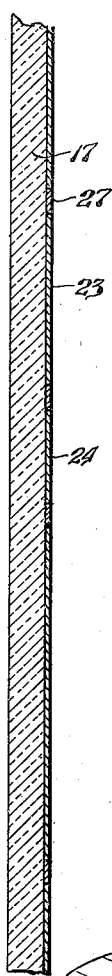
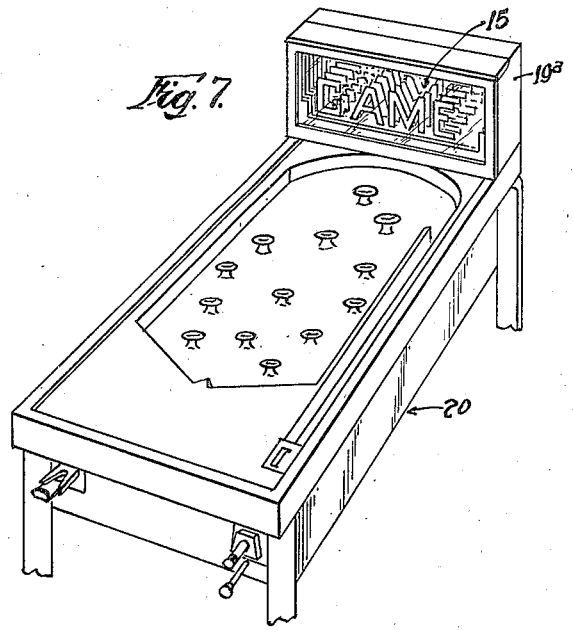
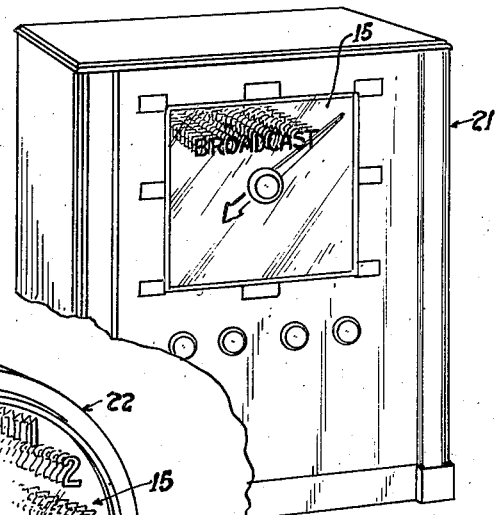
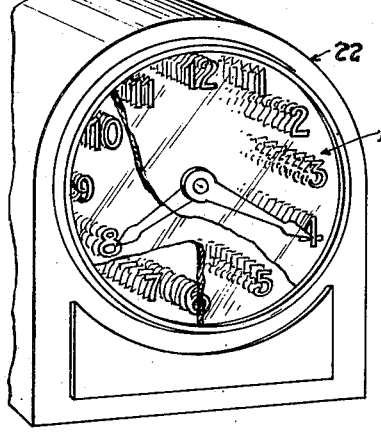
Inventor:
Philip Horinstein,
By: Charles B. Cannon
his Attorney.

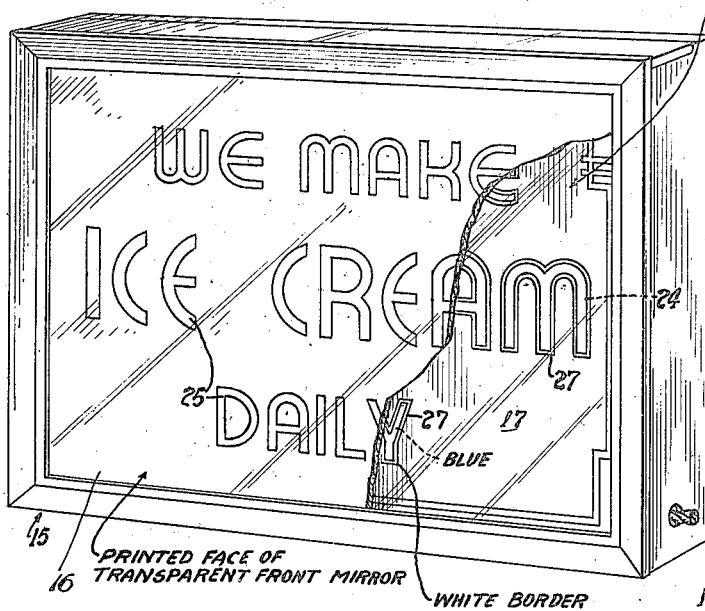
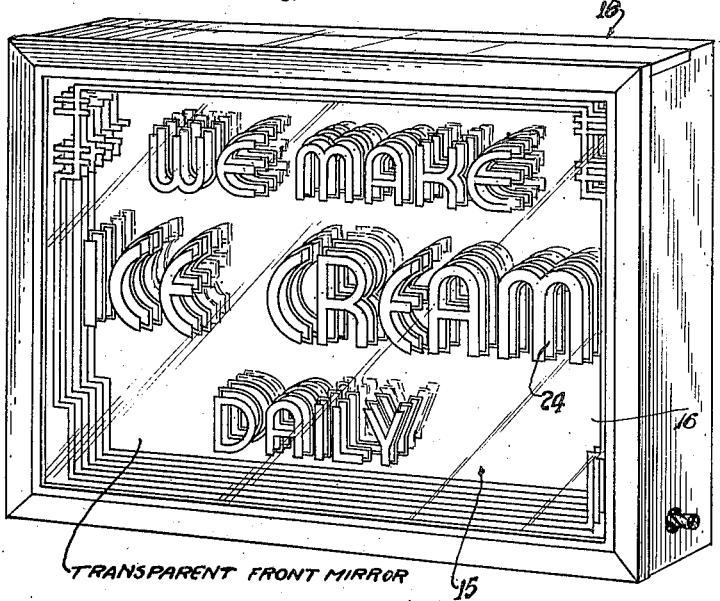
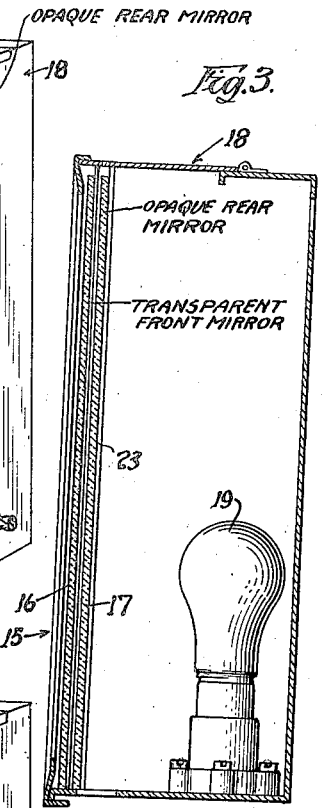

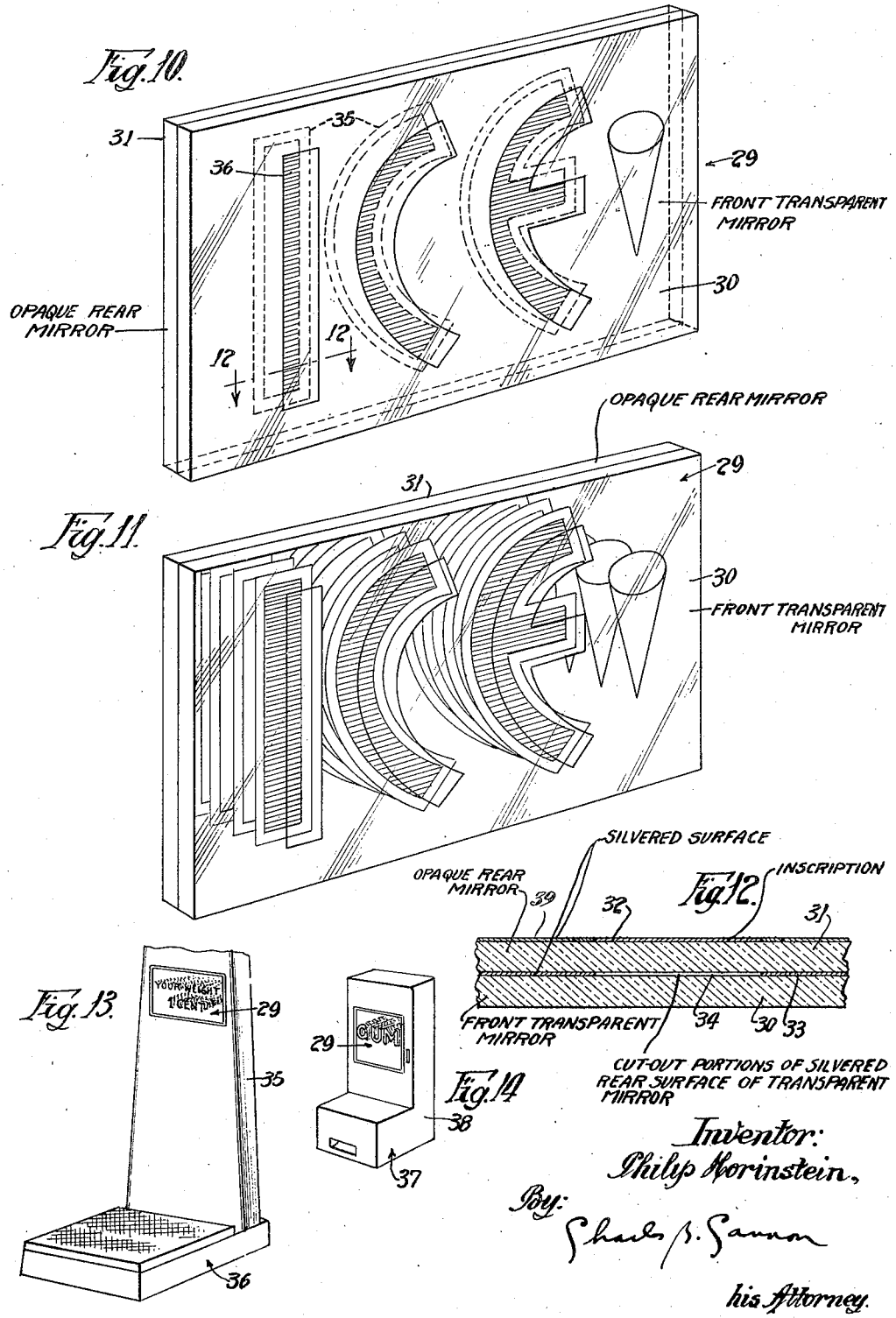

Patented Apr. 19, 1938

2,114,711

UNITED STATES PATENT OFFICE 2,114,711

MIRROR UNIT

Philip Horinstein, Chicago, Ill.

Application August 9, 1937, Serial No. 158,043

8 Claims. (Cl. 40—133)

This invention relates to a mirror unit.

It is an object of this invention to provide an improved mirror unit which is relatively simple and inexpensive in construction and efficient in use.

This application is a continuation in part of my prior Patent No. 2,069,368 granted February 3, 1937, on a Display advertising device and which patent relates to a display advertising device in which there is embodied a so-called third dimensional mirror unit, that is, a combination of mirrors which is so arranged that when they are illuminated they reproduce the indicia or inscription which is inscribed on the rear mirror in such a manner that the images thus reproduced are superimposed so closely upon each other that they produce the illusion of having a third dimension, namely, depth.

There are, however, some practical disadvantages in the use of the prior art mirror units such, for example, as that shown in my above-identified patent, and among these is the fact that when the same is not illuminated the inscription or indicia on the rear surface of the rear or opaque mirror can not be seen so that if a flasher is used in conjunction with the device, for controlling the light source, the inscription can not be seen when the circuit to the light source is broken and hence for a considerable time during the operation of the device the inscription is invisible. Furthermore, the prior art mirror units of the character referred to are of no use unless the light source associated with the same is illuminated and hence such a mirror unit is said, in the language of the trade, to have no "daytime value".

Accordingly, another object of the present invention is to modify the so-called "third dimensional" mirror unit which is shown in my above-identified patent in such a manner that the inscription or indicia printed on the rear or opaque mirror may be seen not only when the same is illuminated to produce the so-called third-dimensional effect but also when the mirror unit is not illuminated, thereby providing the so-called "daytime value" and increasing the utility of the new mirror unit, as well as of the device in which it is used and which may be a display advertising device, radio cabinet, amusement apparatus, electric lamps or the like.

Another difficulty which has been experienced in the use of the prior art mirror units, such as that which is disclosed in my above-identified patent, is the fact that the so-called "third dimensional" image of the indicia or inscription reproduced is often indistinct and hazy, thereby making it difficult for the observer to read the same, and thus decreasing the efficiency thereof.

A further object of the present invention, therefore, is to construct the new mirror unit in such a manner that the so-called third dimensional images of the inscription or indicia inscribed thereon are clear, sharp, and distinct and devoid of the haziness and blur which are frequently found in the use of the prior art so-called third dimensinal mirror units, such, for example, as that which is shown in my above-identified patent.

An additional object of the present invention is to construct the new mirror unit in such a manner that it may be used not only in, and as a part of, a display advertising device or sign but also in conjunction with the cabinets of amusement apparatus, in radio cabinets, clocks, weighing machines, vending machines, and in other places where various indicia, advertising matter, inscription, and the like, may be and are printed for view by the public.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view showing a preferred form of the new mirror unit embodied, for the purpose of illustration, in a display advertising device, and showing the same as it appears when not illuminated, that is, showing how the printing or inscription on the front face of the front or transparent mirror may be seen in ordinary daylight even though the printing or inscription on the rear and opaque mirror is invisible; a part of the front mirror being broken away so as to reveal the rear or opaque mirror and the manner in which the desired inscription is arranged thereon according to the practice of the present invention;

Fig. 2 is a perspective view illustrating the new mirror unit which is shown in Fig. 1 but showing the same as it appears when illuminated;

Fig. 3 is a transverse vertical sectional view of the device which is shown in Figs. 1 and 2;

Fig. 4 is a fragmentary front elevational view of the new mirror unit which is embodied in the present invention and showing part of the front or transparent mirror broken away so as to reveal the rear or opaque mirror.

Fig. 5 is an enlarged vertical sectional detail view of the front or transparent mirror which is embodied in the form of the new mirror unit which is shown in Figs. 1 to 4, inclusive;

Fig. 6 is an enlarged vertical sectional detail view of the rear or opaque mirror which is embodied in the form of the new mirror unit which is shown in Figs. 1 to 4, inclusive;

Fig. 7 is a perspective view of the cabinet of an amusement or game apparatus showing the form of the new mirror unit which is illustrated in Figs. 1 to 6, inclusive, embodied therein;

Fig. 8 is a fragmentary perspective view of a radio cabinet showing the form of the new mirror unit which is illustrated in Figs. 1 to 6, inclusive, embodied therein;

Fig. 9 is a perspective view of a clock showing the form of the new mirror unit which is illustrated in Figs. 1 to 6, inclusive, embodied therein;

Fig. 10 is a perspective view of a modified form of the new mirror unit, and showing the same as it appears when not artificially illuminated, that is, when it is illuminated only by ordinary daylight;

Fig. 11 is a perspective view of the new mirror unit which is shown in Fig. 10 but showing the same as it appears when artificially illuminated to produce the so-called "third-dimensional" effect;

Fig. 12 is a fragmentary sectional view of the form of the new mirror unit which is shown in Figs. 10 and 11;

Fig. 13 is a fragmentary perspective view of a weighing machine showing the form of the new mirror unit which is illustrated in Figs. 10, 11 and 12 embodied therein; and Fig. 14 is a perspective view of a vending machine showing the form of the new mirror unit which is illustrated in Figs. 10, 11 and 12 embodied therein.

A preferred form of the new mirror unit as shown in Figs. 1 to 9, inclusive, of the drawings, is therein generally indicated at 15 and comprises a transparent front mirror 16 and an opaque rear mirror 17, these two mirrors being preferably arranged in close proximity to, or in direct contact with, each other (Fig. 3) although they may, if desired, be spaced slightly apart.

For the purpose of illustrating typical examples and instances of ways and places in which the new mirror unit 15 may be used the same is shown, in Figs. 1, 2 and 3 as being arranged in and forming a part of, the cabinet of a display advertising device, said cabinet being generally indicated at 18, being of conventional design, and having a conventional light source 19 arranged therein. It is to be noted, however, in this connection that the new mirror unit 15 is not confined to use in conjunction with, or for use as a part of, a display advertising device such, for example, as that illustrated in Figs. 1, 2 and 3, since it may be used in various other ways, some of which are illustrated in Figs. 7, 8 and 9. Thus, in Fig. 7 the new mirror unit 15 is shown as being arranged in the upright portion 19 of the cabinet of an amusement game apparatus, said cabinet being generally indicated at 20; in Fig. 8, the new mirror unit 15 is shown as being arranged in a radio cabinet 21; and in Fig. 9 the new mirror unit 15 is shown as being arranged in the casing of, and used as the face of, a clock, said clock casing being generally indicated at 22.

The new mirror unit is shown in Fig. 1 as it appears when seen in ordinary sunlight or daylight, and in Fig. 2 it is shown as it appears when artificially illuminated, from the rear, by the light source 19, in conjunction with which light source a flasher may be used, if desired.

In the practice of the present invention the rear surface of the front mirror 16 is provided with a transparent silvered surface 40 and the rear mirror 17 is provided with an opaque silvered or mirrored rear surface or coating 23 on which the desired inscription 24 (Fig. 1) is printed by the silk screen process, or otherwise, in translucent colors, in a manner which is well understood in the art, and since this process does not form part of the present invention, it need not be described in detail here. It may be noted, however, that the inscription 24 is customarily formed in the manner shown in my aforesaid patent, that is, by removing portions of the silvered rear surface 23 of the rear mirror 17 and then filling in these cut-out portions with translucent paint.

It has been found, however, that when an inscription 24 is printed on the rear surface of the rear or opaque mirror 17 it can not be seen unless the light source 19 is illuminated, in which latter event the said inscription appears, as is shown in Fig. 2, and as though the inscription 24 which is formed on the rear surface of the rear or opaque mirror 17 had a third dimension, namely, depth. For this reason a mirror unit such as that which is shown in my above-identified patent is said, in the language of the trade, to have no "daytime value", and hence is ineffective when the light source is not illuminated, which may be in the intervals between flashes of light from the light source 19, or when it may be desired, as is often the case, to use the new mirror unit, for example, as a part of an ordinary display device or design during the daytime, and as a so-called "third dimensional" sign at night.

Accordingly, in order to overcome the above-mentioned difficulty, experienced in the use of a mirror unit, such as that which is shown in my prior patent referred to above, in making the new mirror unit 15 I print, as at 25, on the front surface of the front transparent mirror 16, and in exact alignment or registration with the inscription 24 on the rear mirror, the same inscription which appears on the latter. Thus, it will be noted, (Fig. 1), that the word "Daily" is printed on the front surface of the front transparent mirror 16 and that the letters which form the same are in exact alignment or registration with the letters which form the same word on the rear surface of the rear or opaque mirror 17. It will also be noted that in Fig. 4 the letters which form the word "Ice", which is inscribed upon the front surface of the transparent mirror 16, are in exact alignment or registration with the corresponding letters which form the same word in the inscription 24 which is written upon the rear surface of the rear or opaque mirror 17, so that when the said mirror unit 15 is illuminated artificially by means of the light source 19, the illuminated inscription 24 which is inscribed upon the rear mirror 17 produces the appearance of a so-called third dimensional effect, namely, depth, and this illuminated inscription is disposed in exact alignment or registration with, and merges into, the corresponding inscription which appears on the front face of the front and transparent mirror 16, thus producing the appearance of a single inscription. However, when the mirror unit 15 is not artificially illuminated, by means of the light source 19, the inscription 25 which is printed on the front surface of the front or transparent mirror 16 may be seen in ordinary sunlight or daylight, thus giving the new mirror unit 15 what is known in the trade as "daytime value", that is, rendering the inscription 25 which is written upon the front surface of the front mirror visible in ordinary sunlight or daylight. It will be seen, therefore, that the inscription 25 on the front surface of the front transparent mirror 16 may be seen by ordinary daylight or sunlight and at the same time it blends with and merges into the illuminated inscription 24 which is inscribed on the rear surface of the rear and opaque mirror 17, when the latter is illuminated by means of the light source 19. It is to be noted, in this connection, that in order for the new mirror unit 15 to work successfully it is necessary that the letters, characters, scenery or other elements which form the inscription or indicia 25 which are printed, or otherwise inscribed, on the front surface of the front and transparent mirror 16 must be in complete and accurate alignment or registration with the corresponding inscription 24 on the rear surface of the rear and opaque mirror 17, and if this is not true it will be found that when the mirror unit 15 is illuminated by the light source 19 the inscription 25 on the front surface of the front mirror 16 will be out of alignment or registration with the multiplicity of images of the corresponding inscription 24 on the rear surface of the rear mirror 17, (which are produced when the latter is illuminated by the light source 19), and the result will be a confusion of images, a very unsatisfactory result.

I have also found, by experimentation with the prior art mirror units, such as that which is shown in my above-identified patent, that there is a tendency for the multiplicity of images which are reproduced, in order to provide the third-dimensional effect, shown in Fig. 2, to be ill-defined and somewhat vague and obscure and difficult for the observer to distinguish from each other. I have found, however, that this difficulty may be obviated, and that clear, sharp and distinct images may be reproduced by forming the body portion of the images, letters, or other elements which form the inscription or indicia 24 upon the rear and opaque mirror 17 of a suitable color such, for example, as blue, and then forming or providing a white border 27 around the marginal edge of each of the same (Fig. 1). I have found that when the letters, characters or other elements which form the inscription or indicia 24 on the rear and opaque mirror 17 are thus formed the images which are reproduced when the mirror unit 15 is illuminated by the light source 19 are much sharper, clearer and more distinct than when the characters are formed of one solid color since the white borders 27 which are formed around the marginal edges of each of the characters or other elements cause the same to stand out clearly and distinctly when they are illuminated, as in Fig. 2, to produce the desired third dimensional effect. Hence, in this manner I am able to overcome the above-mentioned difficulty which has been experienced heretofore in the use of the prior art mirror units, such as that which is shown in my prior patent, referred to above.

A modified form of the new mirror unit as shown in Figs. 10 to 14, inclusive, is therein generally indicated at 29, and comprises a transparent front mirror 30 and a rear and opaque mirror 31, the said rear and opaque mirror 31 having a silvered rear surface 39 which is provided with an inscription 32, which may be inscribed thereon in any suitable manner such, for example, as by means of the silk screen process or otherwise, that is, in the same manner as that by which the inscription 24 on the rear surface of the rear mirror 17 is formed. In this modified form of the new mirror unit, however, in order to render the inscription or indicia thereon visible during the daytime, instead of printing a duplicate inscription on the front face of the front and transparent mirror, as I do when making the front mirror 16, I cut out or otherwise remove, in any suitable manner, as by means of a suitable chemical solution, portions 34 of the silvered or mirrored rear surface 33 of the front mirror 30 corresponding to the letters or other elements which form the same and corresponding inscription, scene, or indicia, on the rear surface of the rear and opaque mirror 31, these cut-out or removed parts 34 being formed in alignment or registration with the corresponding elements of the inscription, scene, or indicia, 32 on the rear surface of the rear mirror 31. Accordingly, when the mirror unit 29 is illuminated artificially, by means of a suitable light source, (such as 19), arranged at the rear thereof, a multiplicity of images of the same will be formed so as to produce the desired third dimensional effect (Fig. 11), whereas when it is desired to use the new mirror unit 29 in the daytime this may be done, without the necessity for any artificial illumination, because of the fact that the inscription, scene, or indicia 32 on the rear surface of the rear mirror 31 may be seen through the correspondingly shaped cut-out or removed portions 34 of the silvered surface 33 of the front mirror 30 and hence the new mirror unit 29 may be used not only for producing the so-called third dimensional effect but also for use in the daytime in any of the ways in which it may be visible such, for example, as a clock face, radio dial, daytime sign, display device, or the like.

In addition to the advantages which have been referred to hereinbefore, the modified form 29 of the new mirror unit, which is shown in Figs. 10, 11 and 12, has the additional and very important advantage over the mirror unit 15 which resides in the fact that there is no printing or the like on the front face of the front mirror 30 to be rubbed off, or to be otherwise removed by action of the weather and exposure to the elements, as may happen to the inscription 25 in the use of the mirror unit 15, since the so-called "daytime value" is provided, in the case of the mirror unit 29, by the cooperation of the inscription 32 on the rear mirror 31 and the corresponding cut-out or removed portions 34 of the silvered rear surface of the front mirror 30, and since both of these surfaces 32 and 33 are on the rear surfaces of the corresponding mirrors 31 and 30, respectively, they are protected against damage by the weather, and against being rubbed off, or otherwise damaged.

In order to illustrate a few of the many ways and places in which the new mirror unit 29 may be used I have shown the same (Fig. 13) as embodied in the cabinet 35 of a coin-controlled weighing machine 36, and as embodied (Fig. 14) in the cabinet 38 of a coin-controlled vending machine 37, in both of which places the new mirror unit 29 may be used for any suitable purpose such, for example, as to carry advertising matter, to attract the attention of passersby, etc., and the same may be illuminated by means of a suitable electric light source arranged in the cabinet 35 of the weighing machine 36, or in the cabinet 38 of the vending machine 37. In addition to the uses, mentioned above, however, the new mirror unit 29 may be used in any of the ways in which the mirror unit 15 is used, such as are illustrated in Figs. 7, 8 and 9, and conversely, the mirror unit 15 may be used in any of the ways in which the mirror unit 29 may be used such, for example, as those which are illustrated in Figs. 13 and 14.

The cut-out portions 34 of the mirrored rear surface 33 of the front mirror 30 are preferably formed so that they are coextensive only with the body portions of the corresponding elements which form the inscription, indicia, or scene 32 on the rear mirror 31, although they may, if desired, be made large enough to cover light-colored marginal edge portions of the latter, with which the said elements may be provided, if desired, as in the case of the mirror unit 15.

While I have illustrated the new mirror units 15 and 29 as carrying inscriptions in the form of words it is to be understood that these are merely for the purpose of illustration and in place of the words shown there may be substituted various scenes, pictures, or any other desired matter which it may be desired to print or inscribe thereon. It may be added, in this connection, that in some cases as, for example, when a scene is inscribed on the rear mirror an entire section of the silvered rear surface 33 of the front transparent mirror 30, in front of the said scene, and coextensive therewith, may be removed from the front mirror 30 instead of merely removing portions of the same. Thus, for example, a suitable scene may be printed or inscribed on the upper half of the rear surface 32 of the rear mirror 31 and the silvered surface 33 removed from the entire upper half of the front mirror 30, thus permitting the said scene to be seen through the upper half of the front mirror 30 in ordinary daylight, and without artificial illumination, while at the same time permitting the lower halves of both the front and rear mirrors 30 and 31, respectively, to be used as a third-dimensional mirror unit, in any of the ways which have been described hereinbefore.

While I have illustrated and described preferred forms of construction for carrying my invention into effect, these are capable of variation and modification, without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A mirror unit of the third-dimensional type comprising an opaque rear mirror and a transparent front mirror, the said rear mirror being provided with a silvered rear surface having cut-out portions filled with light-penetrable material providing an inscription and the said front mirror being provided with an unsilvered front surface having an inscription thereon corresponding to the said first-named inscription, the elements constituting the said second-named inscription being printed in registration with the corresponding elements of the said first-named inscription whereby when the said mirror unit is illuminated from the rear thereof by a source of artificial light the said inscriptions will be superimposed one upon the other and will appear as one, whereas when the said mirror unit is illuminated by natural light only the said second-named inscription on the said front mirror is visible to the eye of the observer from the front thereof.

2. A mirror unit of the third-dimensional type comprising an opaque rear mirror and a transparent front mirror, the said rear mirror being provided with a silvered rear surface having cut-out portions filled with light-penetrable material providing an inscription and the said front mirror being provided with an unsilvered front surface having an inscription thereon corresponding to the said first-named inscription, the elements constituting the said second-named inscription being printed in alignment with the corresponding elements of the said first-named inscription whereby when the said mirror unit is illuminated from the rear thereof by a source of artificial light the said inscriptions will be superimposed one upon the other and will appear as one, whereas when the said mirror unit is illuminated by natural light only the said second-named inscription on the said front mirror is visible to the eye of the observer from the front thereof, each of the elements of the said first-named inscription including a colored body having a white marginal edge or border therearound.

3. A mirror unit of the third-dimensional type comprising an opaque rear mirror and a transparent front mirror, the said rear mirror being provided with a silvered rear surface having cut-out portions filled with light-penetrable material providing an inscription and the said front mirror being provided with an unsilvered front surface having an inscription thereon corresponding to the said first-named inscription, the elements constituting the said second-named inscription being printed in alignment or registration with the corresponding elements of the said first-named inscription whereby when the said mirror unit is illuminated from the rear thereof by a source of artificial light the said inscriptions will be superimposed one upon the other and will appear as one, whereas when the said mirror unit is illuminated by natural light only the said second-named inscription on the said front mirror is visible to the eye of the observer from the front thereof, each of the elements of the said first-named inscription including a relatively dark-colored body having a relatively light-colored marginal edge or border therearound.

4. A mirror unit of the third-dimensional type comprising an opaque rear mirror and a transparent front mirror, the said rear mirror being provided with a silvered rear surface having cut-out portions filled with light-penetrable material providing an inscription and each of the component parts of the said inscription including a colored body having a white marginal border therearound.

5. A mirror unit of the third-dimensional type comprising an opaque rear mirror and a transparent front mirror, the said rear mirror being provided with a silvered rear surface having cut-out portions filled with light-penetrable material providing an inscription and each of the component parts of the said inscription including a relatively dark-colored body having a relatively light-colored marginal border therearound.

6. A mirror unit of the third-dimensional type comprising an opaque rear mirror and a transparent front mirror, the said rear mirror being provided with a silvered rear surface having cut-out portions filled with light-penetrable material providing an inscription, and the said front mirror also being provided with a silvered rear surface and the latter having portions thereof cut out and the said cut-out portions corresponding in shape and configuration to, and being in alignment with, the elements constituting the said first-named inscription on the rear mirror.

7. A mirror unit of the third-dimensional type comprising an opaque rear mirror and a transparent front mirror, the said rear mirror being provided with a silvered rear surface having a cut-out portion filled with light-penetrable material, an inscription, and the said front mirror also being provided with a silvered rear surface and the latter having a portion thereof cut out, and the said cut-out portion of the silvered rear surface of the said front mirror corresponding in configuration to the said first-named inscription on the said rear mirror.

8. A mirror unit of the third dimensional type comprising an opaque rear mirror and a transparent front mirror, the said rear mirror including a silvered rear surface having a cut-out portion filled with light-penetrable material providing an inscription, and the said front mirror also including a silvered rear surface and the latter having a portion thereof cut-out, in front of the said first-named cut-out portion and inscription, so as to render the latter visible by natural light from the front thereof.

PHILIP HORINSTEIN.